Patented Jan. 27, 1931

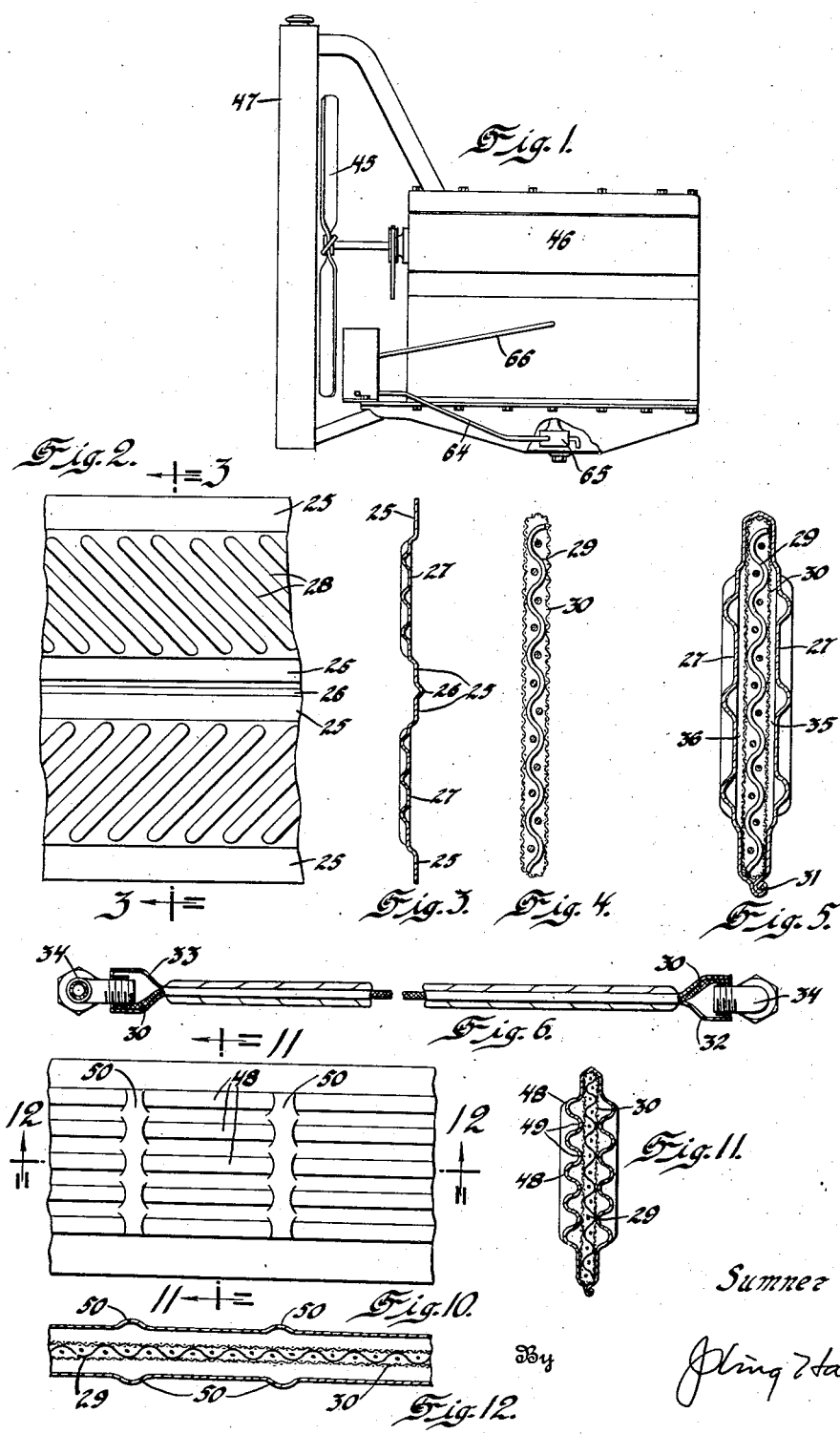

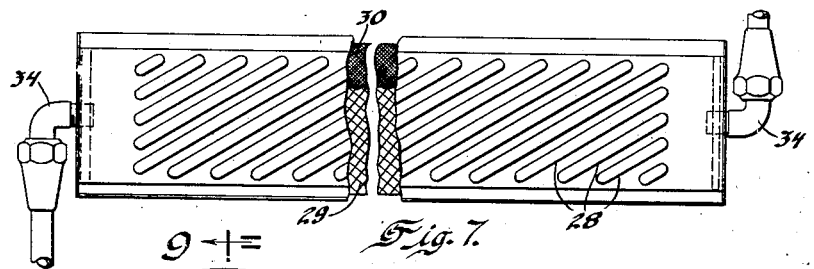
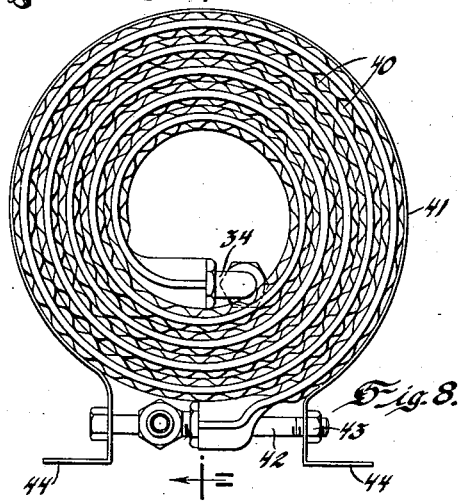
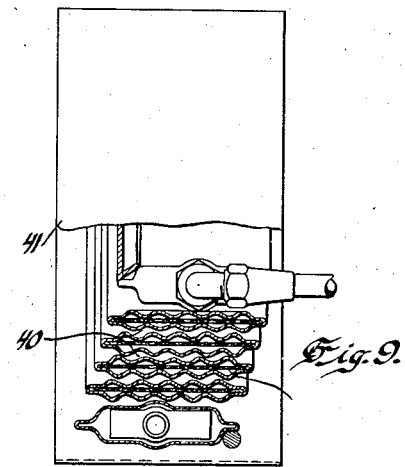
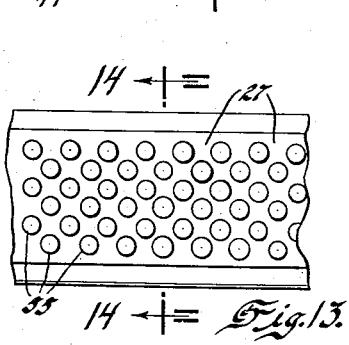
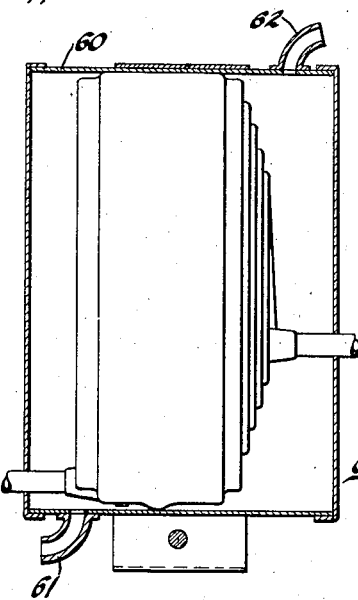
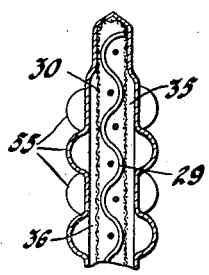

1,790,036

UNITED STATES PATENT OFFICE

SUMNER WILTSE, OF DETROIT, MICHIGAN

FILTER AND METHOD OF MAKING THE SAME

Application filed July 30, 1928. Serial No. 296,141.

This invention relates to filters for use in the separation of solid particles from liquids, the principal object being the provision of an efficient filter economical to manufacture, and the method of forming the same.

Another object is to provide a filter having a maximum effective free face area of radiation.

Another object is to provide a filter of ribbon-like form including a relatively flat sheet metal casing enclosing a filtering element.

Another object is to provide a filter comprising a casing and a filtering element, the filtering element being of ribbon-like formation, and the casing formed of sheet metal bent over the same and confining the edges thereof.

Another object is to provide a filter of the type above described in which the surface of the casing is provided with outwardly extending projections or ribs serving to increase the effective free face area of radiation of the filter.

Another object is to provide a filter initially formed into a generally ribbon or strip-like shape and then bent or otherwise formed into a compact structure permitting the circulation of a cooling medium about the same.

Another object is to provide a combined oil filter and cooler comprising a filtering element of ribbon or strip-like formation which is bent to bring various portions of the exterior surface thereof into adjacent but spaced relationship with other portions of the exterior surface thereof.

A further object is to provide in combination with a motor vehicle and the engine thereof, a combined oil cooler and filter comprising a filtering element of strip-like formation connected with the lubricating system of the engine, the filtering element being bent in spiral or other formation with portions of the exterior surface thereof in adjacent but spaced relationship to other portions of the exterior surface thereof whereby to form it into a compact structure which will permit flow of air or fluid through the same, such structure being positioned back of the cooling fan of the engine whereby the air put in motion by the fan will be forced over the exterior surfaces of the filtering element and thereby cool the oil passing through the filter.

The above being among the objects of the present invention, the same consists in certain features of construction, and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views,—

Fig. 1 is a more or less diagrammatic side elevation of the engine for a motor vehicle, the cooling radiator being shown in connection therewith, and a combined oil filter and cooler mounted thereon.

Fig. 2 is a plan view of a portion of the sheet metal strip employed as a casing or housing for the filtering element, before bending.

Fig. 3 is a sectional view taken on the line 3—3 of Fig. 2.

Fig. 4 is an enlarged sectional view of the filtering element.

Fig. 5 is an enlarged sectional view through the filter showing the manner in which the sheet strip shown in Figs. 2 and 3 is assembled about the filtering element shown in Fig. 4.

Fig. 6 is a partially broken view of the

Fig. 6 is a partially broken edge view of the assembled filter before bending.

Fig. 7 is a plan view of the assembled filter before bending.

Fig. 8 is an end view of the filter bent into spiral formation for the purpose of compactness, and provided with a supporting bracket.

Fig. 9 is a partially sectioned side view of the filter shown in Fig. 8, taken as on line 9—9 of Fig. 8.

Fig. 10 is a plan view of a filter having a modified form of casing or housing.

Fig. 11 is a sectional view taken on line 11—11 of Fig. 10.

Fig. 12 is a sectional view taken on line 12—12 of Fig. 10.

Fig. 13 is a plan view of a filter provided with a different modification of the housing or casing construction.

Fig. 14 is an enlarged sectional view taken on line 14—14 of Fig. 13.

Fig. 15 is a perspective view of another modified form of casing or housing construction.

Fig. 16 is a side view showing the manner in which the filter may be formed into a spiral and placed within a shell or casing through which a cooling liquid may be circulated, the shell being shown in section.

It has become well-known in the motor vehicle industry that an efficient filter for the lubricating oil of the engine is desirable, if not necessary, in order to obtain maximum life of the engine. The present invention deals with a filter applicable for this, as well as other uses, and provides a construction that is extremely efficient in operation and exceedingly economical to manufacture. It is obvious, of course, that the filter may likewise be used for separating the solids from liquids in connection with devices other than internal combustion engines.

It has also been recognized that results of equal importance, as far as engine life is concerned, may be obtained by maintaining the lubricating oil below a definite maximum temperature, as well as filtering the oil, but heretofore, as far as I am aware, the constructions have been such that they were not feasible for production of motor vehicles due to the relatively great cost of applying them to the same, and consequently their appearance has been limited to racing cars where the need of the cooling feature is of major importance.

Due to the construction of the filter in the present invention I am enabled to so form it so as to provide an oil cooler of extremely efficient design which is amply able to maintain the lubricating oil below a maximum desirable temperature with consequent advantages resulting therefrom.

In accordance with the present invention I show in Figs. 2 and 3 a strip of sheet metal upon which the preliminary forming operations have been made in order to prepare it as a housing or casing for the filtering element for my filter.

As shown in these figures the strip of metal has been formed to provide four longitudinally extending flat portions 25 two of which extend along the margins of the strip, and the other two of which are positioned midway between the margins and separated by a relatively shallow trough shaped depression 26 provided to facilitate bending of the strip during a later operation. That portion of the sheet between each edge of the marginal portion 25 and the adjacent central portion 25 is offset from the plane of the portions 25 a slight amount as at 27, and in the portions 27 are formed similarly extending inverted trough-shaped or bead-like projections or ribs 28 which extend at an angle to the length of the strip. A filtering element is formed as indicated in Fig. 4 and comprises a strip of wire screen 29 which may be of relatively open mesh and of a width slightly less than half of the width of the strip from which the housing or casing is formed. The wire screen strip 29 is enclosed by a sheet 30 of filtering material which may be of fabric, fine wire mesh, or other suitable material designed to prevent the passage of solids therethrough but permitting the passage of liquids. The strip shown in Figs. 2 and 3 is then bent at the depression 26 about the filtering element shown in Fig. 4, as indicated in Fig. 5, the marginal edges being brought together and crimped as at 31 or otherwise sealed against leakage, and the margins of the filtering element 29—30 being clamped between opposed faces 25. The ends of the housing or casing strip are spread as at 32 and 33 in Fig. 6, and the filtering element at one end is bent against one side surface of the casing and at the other end is bent against the opposite side surface. Connections such as 34 are provided at such ends for the entrance and discharge of liquid, and such connections may be employed to hold the adjacent end of the filtering element against the proper side of the housing.

Referring to Fig. 5 it will be noted that the portion 27 of the housing is slightly spaced from the outer surface of the filtering material 30 over the greater part of the width of the filtering element so as to form chambers or passages 35 and 36 to permit the flow of liquid between the filtering element and the portion 27 of the housing on either side of the filtering element.

In operation, oil or other liquid is introduced through one of the connections 34 and flows lengthwise of the filter through one of the chambers 35 or 36 between the portion 27 and the adjacent fabric 30, and due to the difference in pressure between the inlet and outlet of the filter, the oil or liquid passes through the fabric 30 and into the space 35 or 36, as the case may be, between the opposite portion 27 and the adjacent fabric 30 where it is conducted to the discharge connection 34. In practice, I make the filter of relatively great length so that a maximum area of the material 30 is presented for the passage of the liquid therethrough. This insures a minimum velocity of the liquid being filtered with consequent efficiency in removal of the solids therefrom. The projections or ribs 28 are formed primarily to increase the effective free face area of radiation of the housing so that the housing in being heated by the oil or other liquid passing through the same will present a maximum free area of external radiation surface for dissipation of the heat carried by the liquid. This feature enables the filter to be used not merely as a filter for use in connection with the lubrication system of an internal combustion engine, but also as a means for cooling the lubricating oil.

It will be obvious that the ribbon-like filter indicated in Figs. 6 and 7 may be employed in such form, that is, flat, to function both as a filter and an oil cooler, and in fact where such construction is employed in connection with the engines of airplanes and the like where a minimum air resistance is necessary, it may be preferable to leave the filter in the flat condition. However, when such filter is employed in connection with a motor vehicle, it is usually desirable that it be as compact as possible, and the construction of the present filter lends itself to this feature. This may be accomplished as indicated in Figs. 8 and 9 in which the filter is coiled up to form a spiral formation, the various coils of which are slightly spaced from each other so as to form air pasasges 40 extending from one side to the other between the various coils. The filter thus coiled as indicated in Figs. 8 and 9 may be provided with a suitable supporting means such as the sheet metal strip 41 which is bent around the same and is clamped in such position by means of one or more bolts 42 extending between the opposite ends of the strip 41 and drawn into place by nuts such as 43, the free ends of the strip being bent outwardly as at 44 to form attaching portions for securement to a part of the motor vehicle.

One of the connections 34 is connected by a tube such as 64 to the discharge side of the oil pump 65 of the engine 46, and the other connection 34 is connected to a tube such as 66 leading to the various bearing surfaces (not shown) of the engine. This method of connecting up the filter may, of course, be varied, such as by providing means whereby only a portion of the oil from the pump 65 passes through the filter, as in some conventional constructions.

This assembly is preferably secured immediately back of the fan 45 of the engine 46 with its axis parallel to the axis of the fan so that when the fan is rotating to draw air through the radiator 47 such air is forced through the passages 40 and thereby absorbs heat from the filter. It will be noted that when the beads or projections 28 are formed at an angle to the length of the filter strips, as indicated in Fig. 2, the air passages 40 between the various coils of the filter will impart to the air passed through the filter a swirling motion which will cause the air to come into more intimate contact with the radiating surfaces of the filter and also maintain such air in contact with the surface of the filter for a greater length of time than if it were passed directly through the same, due to the fact that the travel path of the air through the filter is greater. Furthermore, when the beads or projections 28 are placed at an angle, as shown, they provide means whereby the outer surface of each coil may stretch and the inner surface be compressed when the strip-like filter is being wound into the spiral.

It is, of course, not essential that the beads or ribs 28 be employed at all, or if employed, be disposed as indicated in Figs. 2 and 3. In fact, it may be found desirable to replace them with longitudinally extended beads or ribs such as indicated at 48 in Figs. 10, 11 and 12, and in which that portion 49 of the strip between the beads 48 bears against the fabric portion 30 of the filtering element. In this case, inasmuch as the beads or projections 48 extend longitudinally of the filter from end to end no chamber such as 35 and 36 need be specially provided, inasmuch as the area enclosed by such beads or projections provides passages for the liquid being filtered from one end of the filter to the other. Where such longitudinally extending beads or ribs 48 are employed and I desire to coil the filter as indicated in Figs. 8 and 9, I prefer to provide transverse beads or ribs such as 50 at spaced intervals along the length of the filter so that in coiling up the filter the outer beads or ribs 50 may stretch and the inner ones be compressed to facilitate such coiling.

Instead of the beads or ribs as disclosed in the previous figures the surface of the portion 27 may be provided with a plurality of projections such as indicated at 55 in Figs. 13 and 14, the effect of the same being to increase the effective free area of radiation of the filter as in the previous cases. The construction may also be varied as indicated in Figs. 15 in which the filter is provided with transversely extending rib or bead portions 58. This last construction permits great ease in coiling the filter element to the position shown in Figs. 8 and 9 and the space between the various ribs or beads 58 provide direct paths for the passage of air between the front and rear faces of the same.

It is to be noted that in the construction shown in Figs. 5 and 14 chambers 35 and 36 are provided on each side of the fabric 30. This may not at all be essential, particularly where the sheet metal housing or casing for the fabric 30 is formed of very thin sheet metal as is preferable both from the standpoint of economy in production and rapidity of heat transfer, for in such a case although the portion 27 might bear against the fabric 30 when the engine to which it is connected is not operating, when the engine is operating and the interior of the filter is subjected to the pressure present on the discharge side of the engine oil pump, such pressure will tend to separate the side portions 27 of the filter and will thereby provide sufficient area on either side of the fabric 30 to allow an ample flow of oil therethrough.

It may also be noted that the particular type of ribs or projections on the housing portion of the filter may govern, in some cases, the particular manner of coiling or otherwise forming the same into a compact structure. For instance, in the construction shown in Figs. 6 and 7 some of the ribs of one coil may contact with some of the ribs of the adjacent coil when formed as in Figs. 8 and 9, the spaces between the ribs forming air ducts for the passage of air from the front to the rear face of the assembly. However, where ribs such as 48 in Figs. 10, 11 and 12 are employed, the ribs 48 of one coil should not contact with the ribs 48 of the next coil or such air passage through the filter would be prevented. In any case, the various coils should be in generally spaced relation with respect to each other, as shown, to permit the flow of air between them, as will be readily apparent.

In some constructions it may be desirable to cool the filter by a cooling liquid rather than air, and in such case it is obvious that the filter coiled as shown in Figs. 8 and 9 may be inserted in a shell such as 60 in Fig. 16, such shell being provided with a liquid inlet such as 61 and liquid outlet such as 62. The shell 60 in such case preferably contacts with the outer surface of the coiled filter as indicated in Fig. 16, and the inlet 61 is positioned on the opposite side of the filter from the outlet 62 thus insuring all of the cooling liquid entering the inlet 61 passing through the coils of the filter before escaping through the outlet 62.

It is to be further noted that although I have described the foregoing constructions as adaptable for cooling the filtered liquid, it is obvious that in some cases it may be desirable to employ them for heating the filtered liquid, and as such constructions are primarily heat interchange devices, their application as heating means is obvious.

Another feature which is obvious, but which may well be noted, is that although I have described the above constructions as being primarily filters, the primary function of the same may well be that of a heat interchange device or radiator, and in fact where the filtering feature is of such minor importance as to be disregarded, the constructions coiled as in Figs. 8 and 9 may be employed with no filtering element whatsoever within them, and thus serve solely as an oil cooling device.

Although I have shown in the accompanying drawings only one method of forming the filter into a compact unit, that is, by rolling it into a spiral formation, it will be apparent that this may be varied as desired. For instance, the filter, as shown in Figs. 6 and 7 may be bent back and forth upon itself to accomplish the same end as is accomplished by forming it into a spiral, and these and other formal changes may be made in the specific embodiment of the invention described without departing from the spirit or substance of the broad invention, the scope of which is commensurate with the appended claims.

What I claim is:

1. A filter comprising a ribbon-like filtering element enclosed in a ribbon-like sheet metal casing readily bendable about a line parallel to a face thereof and transverse to its length.

2. A filter comprising a relatively thin elongated imperforate sheet metal housing formed from a single strip of sheet metal and interiorly divided along its length by a filtering element.

3. A filter comprising a continuous relatively thin ribbon-like sheet metal housing bent about one or more lines transverse to its length to form a relatively compact structure, a continuous relatively thin ribbon-like filtering element received in said housing and sealed at its margins against the passage of liquid between said casing and said margins, and an inlet and an outlet for said housing.

4. A filter comprising, in combination, a relatively thin elongated sheet metal housing, a filtering element received within said housing with its margins clamped between opposed walls of said housing, said housing between said margins being formed with a plurality of outwardly extending projections thereon, and an inlet and outlet for said housing.

5. A filter comprising, in combination, a ribbon-like filtering element, a housing for said filtering element comprising a strip of sheet metal bent upon itself between its margins and receiving said filtering element therein, the margins of said strip being sealed together over said filtering element, and an inlet and outlet for said housing.

6. A strip-like filter including a ribbon-like sheet metal housing enclosing a ribbon-like filtering element bent into a relatively compact structure with portions of the exterior surface thereof in spaced but adjacent relationship with respect to other portions of the exterior surface thereof.

7. A ribbon-like filter including a ribbon-like sheet metal housing enclosing a ribbon-like filtering element formed into a coiled structure, each coil of which is generally spaced from the adjacent coil to permit the passage of cooling fluid between the same 8. A filter comprising a strip of filtering material encased in a housing and both of which are coiled, the various coils of said filter being positioned relative to each other to permit the circulation of a cooling fluid between them.

9. A filter comprising, in combination, a strip of open mesh wire screen surrounded by a casing of filtering material, and all of which is enclosed in a relatively thin ribbon-like sheet metal housing, said housing being interiorly divided over substantially its entire length by said screen and material and being formed to provide a passage on each side thereof, an inlet in one end of said housing on one side of said material, and an outlet in the other end of said housing on the other side of said material.

10. The method of forming a filter comprising in bending a strip of metal about a line between its margins, inserting a strip-like filtering element between the opposed faces of said bent strip, and then bringing together and sealing the margins of said strip about said element.

11. The method of forming a filter comprising in bending a strip of metal about a line between its margins, inserting a strip-like filtering element between the opposed faces of said bent strip, then bringing together and sealing the margins of said strip about said element, and then coiling said strip and element.

12. The method of forming a filter comprising in preparing a filtering element by enclosing a strip of screen by a sheet of filtering material, and then enclosing said screen and material by a sheet metal strip bent about a line between its margins and clamping the margins of said strip and material between opposed faces thereof.

13. In combination with the lubricant circulation system of an internal combustion engine, a device forming a part of said system comprising an imperforate sheet metal housing bent into a spiral formation, said housing being provided with a plurality of lubricant conducting ribs extending in one direction to provide lubricant ducts, and a plurality of ribs extending in a direction at an angle to the first mentioned ribs, whereby said housing may be bent into spiral formation.

14. A filter comprising a continuous ribbon-like sheet metal housing bent into a compact structure, a continuous ribbon-like filtering element secured between opposite side edges of said housing and dividing the interior thereof into two passages, an inlet for one of said passages at one end of said housing, an outlet for the other of said passages at the other end of said housing, outwardly extending series of ribs formed on the exterior of said housing and extending in the direction of the length thereof, and an outwardly extending transversely disposed rib formed on said housing between each of said series.

15. A filter comprising a filter element, a housing enclosing the filtering element, an inlet and an outlet in said housing on opposite sides and at opposite ends of said filtering element, longitudinal corrugations in said housing spacing the filtering element in the housing, said corrugations on the inlet side providing a passage for the fluid to be filtered, said corrugations on the outlet side providing a passage for the filtrate, and transverse corrugations in the housing.

16. A filter comprising a filter element, a convolute housing enclosing the filtering element, an inlet and an outlet in said housing on opposite sides and at opposite ends of said filtering element, longitudinal corrugations in said housing spacing the filtering element in the housing, said corrugations on the inlet side providing a passage for the fluid to be filtered, said corrugations on the outlet side providing a passage for the filtrate, and transverse corrugations in the housing, the convolutions of the housing being spaced by the transverse corrugations.

17. In combination with the lubricant circulation system of a machine, a cooling medium, a cooling device in said medium, said cooling device forming a part of said system, comprising a lubricant conducting housing, bent into convolutions and corrugated longitudinally and transversely, the longitudinal corrugations forming lubricant circulation ducts and the transverse corrugations spacing the convolutions of the housing, whereby transverse passages are provided for the cooling medium between the adjacent convolutions of the lubricant conducting housing.

18. In combination with the lubricant circulation system of a machine, a cooling medium, a cooling device in said medium, said cooling device forming a part of said system, comprising a lubricant conducting housing, bent into convolutions and corrugated longitudinally and transversely, the longitudinal corrugations forming lubricant circulation ducts and the transverse corrugations spacing the convolutions of the housing, corresponding portions of the longitudinal corrugations of adjacent convolutions of the housing being in echelon, whereby transverse passages are provided for the cooling medium between the adjacent convolutions of the lubricant conducting housing.

19. A filter comprising a continuous relatively thin ribbon-like sheet metal housing bent about one or more lines transverse to its length to form a relatively compact structure, a continuous relatively thin ribbon-like filtering element received in said housing and sealed at its margins against the passage of liquid between said casing and said margins, and an inlet and an outlet for said housing, said inlet and outlet being on opposite sides of said filtering element, the sides of said strip having longitudinal corrugations therein, the inner portions of the corrugations spacing the strip intermediately of the housing and the outer portions of the corrugations forming ducts, for the fluid to be filtered on the inlet side, and for the filtrate on the outlet side.

20. A filter comprising, in combination, a ribbon-like filtering element, a housing for said filtering element comprising a strip of sheet metal bent upon itself between its margins and receiving said filtering element therein, the margins of said strip being sealed together over said filtering element, and an inlet and outlet for said housing, said inlet and outlet being on opposite sides of said filtering element, the sides of said strip having longitudinal corrugations therein, the inner portions of the corrugations spacing the strip intermediately of the housing and the outer portion of the corrugations forming the fluid to be filtered on the inlet side, and for the filtrate on the outlet side.

SUMNER WILTSE.